(12) United States Patent
Celo et al.

(10) Patent No.: US 9,513,447 B1
(45) Date of Patent: Dec. 6, 2016

(54) ACTIVE PHOTONIC INTEGRATED CIRCUIT (PIC) WITH EMBEDDED COUPLING EFFICIENCY MONITORING

(71) Applicant: Huawei Technologies Co., Ltd., Shenzhen (CN)

(72) Inventors: Dritan Celo, Nepean (CA); Dominic John Goodwill, Ottawa (CA); Eric Bernier, Ottawa (CA)

(73) Assignee: Huawei Technologies Co.., Ltd., Shenzhen (CN)

( * ) Notice: Subject to any disclaimer, the term of this patent is extended or adjusted under 35 U.S.C. 154(b) by 0 days.

(21) Appl. No.: 14/712,153

(22) Filed: May 14, 2015

(51) Int. Cl.
| G02B 6/26 | (2006.01) |
| G02B 6/42 | (2006.01) |
| G02B 6/34 | (2006.01) |
| G02B 6/122 | (2006.01) |

(52) U.S. Cl.
CPC ........... *G02B 6/4225* (2013.01); *G02B 6/1225* (2013.01); *G02B 6/34* (2013.01); *G02B 6/4291* (2013.01)

(58) Field of Classification Search
None
See application file for complete search history.

(56) References Cited

U.S. PATENT DOCUMENTS

| 6,181,856 | B1 | 1/2001 | Brun |
| 6,556,751 | B1 | 4/2003 | Lee et al. |
| 2003/0169422 | A1* | 9/2003 | Mukai ................... G02B 6/4222 356/399 |
| 2003/0174329 | A1 | 9/2003 | Kuper et al. |
| 2013/0273672 | A1 | 10/2013 | Heck et al. |
| 2014/0185983 | A1 | 7/2014 | Sandhu et al. |
| 2015/0117812 | A1 | 4/2015 | Brooks et al. |
| 2015/0355421 | A1* | 12/2015 | Li ........................ G02B 6/4225 250/227.14 |

FOREIGN PATENT DOCUMENTS

| CN | 1261160 A | 7/2000 |
| CN | 1274427 A | 11/2000 |
| CN | 104204882 A | 12/2014 |

OTHER PUBLICATIONS

O'Brien, "Silicon PIC Packaging," ECOC 2013, ICC London ExCeL, UK, Sep. 22-26, 2013, 15 pages.
Foreign Communication from a related application, PCT Application PCT/CN2016/081718, International Search Report dated Aug. 17, 2016, 7 pages.
Foreign Communication from a related application, PCT Application PCT/CN2016/081718, Written Opinion dated Aug. 17, 2016, 8 pages.

* cited by examiner

*Primary Examiner* — Sung Pak
(74) *Attorney, Agent, or Firm* — Conley Rose, P.C.

(57) ABSTRACT

An apparatus comprising a first photonic device comprising a waveguide loop configured to guide a first light from a first location of a surface to a second location of the surface, and a second photonic device comprising a light source configured to provide the first light, and a first alignment coupler optically coupled to the light source and configured to optically couple to the waveguide loop at the first location, a second alignment coupler configured to optically couple to the waveguide loop at the second location, and a photodetector optically coupled to the second alignment coupler and configured to detect the first light when the waveguide loop is aligned with the first alignment coupler and the second alignment coupler, and generate, based on the detection and on the received light, an electrical signal.

19 Claims, 8 Drawing Sheets

ACTIVE PHOTONIC INTEGRATED CIRCUIT (PIC) WITH EMBEDDED COUPLING EFFICIENCY MONITORING

BACKGROUND

Edge coupling with edge couplers is a standard technique for coupling between single-mode fibers and photonic integrated circuit (PIC) devices such as optical switches, modulators, high-speed detectors, and interposers. Edge coupling provides a broadband response, offers low insertion loss (IL), and couples both transverse electric (TE) modes and transverse magnetic (TM) modes. Edge couplers include nano-tapered edge couplers, or spot size converters, and evanescent edge couplers. Evanescent edge couplers couple to optical fibers using a nano-taper that is coupled to a second, larger waveguide. The waveguide is formed of a polymer or an inorganic material such as silicon oxynitride (SiON) or an oxide.

Coupling efficiency is high when the mode field diameter (MFD) of a fiber and a waveguide are matched and when incoming light and outgoing light are aligned. Coupling efficiency is sensitive to misalignment, for example, between a fiber and a waveguide. As an example, a 0.5 micrometer (μm) lateral offset of an inverted-taper spot size converter (SSC) reduces a coupled light power output by half.

Optical coupling of multiple channels in an active PIC is challenging and expensive. Optical coupling of multiple channels is prone to signal drifting during the lifetime of operation. It is desirable to monitor edge coupling alignment between single-mode fibers and PICs during the lifetime of operation.

SUMMARY

In one embodiment, the disclosure includes an apparatus comprising a first photonic device comprising a waveguide loop configured to guide a first light from a first location of a surface to a second location of the surface, and a second photonic device comprising a light source configured to provide the first light, and a first alignment coupler optically coupled to the light source and configured to optically couple to the waveguide loop at the first location, a second alignment coupler configured to optically couple to the waveguide loop at the second location, and a photodetector optically coupled to the second alignment coupler and configured to detect the first light when the waveguide loop is aligned with the first alignment coupler and the second alignment coupler, and generate, based on the detection and on the received light, an electrical signal.

In another embodiment, the disclosure includes an optical edge coupling method comprising transmitting a first light to a waveguide loop on a first photonic device via a first alignment coupler on a second photonic device, detecting the first light at a second alignment coupler on the second photonic device, and determining an alignment of the first photonic device and the second photonic device based on the detection.

In yet another embodiment, the disclosure includes an apparatus comprising a light source optically coupled to a first alignment coupler and configured to output a first light, a photodetector optically coupled to a second alignment coupler and configured to detect the first light, and a controller configured to generate a control signal for the light source to output the first light, receive an electrical signal in response to the photodetector detecting the first light, and monitor the detected first light.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalents.

Disclosed herein are various embodiments for providing optical edge coupling alignment and edge coupling monitoring capabilities. The efficiency of the optical alignment is monitored to detect misalignments, for instance those caused by thermo-mechanical induced stresses. For example, the coupling efficiency between a fiber coupler and an active PIC can be monitored during normal operation. Edge coupling alignment and monitoring capabilities of an active PIC can be provided by the active PIC itself. Edge coupling alignment with active edge coupling monitoring evaluates and monitors optical interconnect efficiency of active PICs. In multi-chip packages, stacked dies, and system packages applications, edge coupling alignment with active edge coupling monitoring the active PIC can be seen as a packaging platform that serves as a high-density substrate with a redistribution layer. A packaging platform allows incompatible technologies to be mixed onto the same platform for heterogeneous integration. Edge coupling alignment and active edge coupling monitoring may be implemented in optical system applications where optoelectronic packaging is used, or in applications with optical switches that have a large number of fiber channels such as metro networks or data centers.

Figure 1:
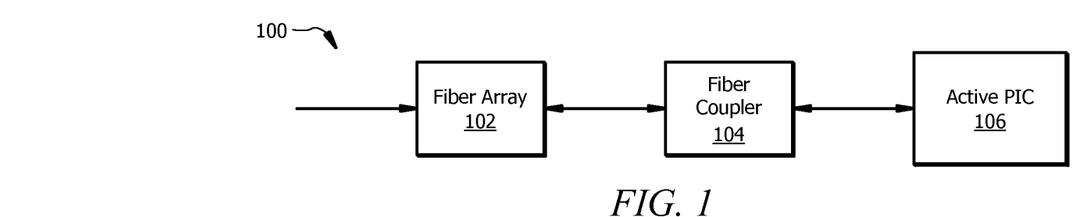
FIG. 1 is a schematic diagram of an embodiment of an optical system.

FIG. 1 is a schematic diagram of an embodiment of an optical system 100. Optical system 100 includes a fiber array 102, a fiber coupler 104, and an active PIC 106. Optical system 100 is configured to communicate light along a light path from fiber array 102 to fiber coupler 104 and from fiber coupler 104 to active PIC 106 using a plurality of waveguides (e.g., single-mode optical fibers and/or multi-mode waveguides). Optical system 100 may be configured as shown or in any other suitable manner.

Fiber array 102 is configured to receive light and to guide the light to fiber coupler 104. Fiber array 102 has a plurality of optical fibers optically coupled to fiber coupler 104. The optical fibers may include single-mode waveguides and/or multi-mode waveguides. For example, fiber array 102 may be a V-groove assembly that is configured to carry a single-mode optical fiber core within the V-grooves of the V-groove assembly. Examples of fiber array 102 include, but are not limited to, fiber ribbons and V-groove assemblies.

Fiber coupler 104 is optically coupled to fiber array 102 and active PIC 106. Fiber coupler 104 is configured to receive light from fiber array 102, to reduce the MFD of the received light, and to guide the light to active PIC 106. Fiber coupler 104 may also be referred to as an MFD converter or MFD reducer. Fiber coupler 104 is also configured to assist with edge coupling alignment between fiber coupler 104 and active PIC 106. Examples of fiber coupler 104 include, but are not limited to, a lithography defined polymer waveguide, a lithography defined planar lightwave circuit (PLC) fan-in field reducer, an MFD-reducing or pitch-reducing assembly, an integrated polymer waveguide evanescently coupled to an on-chip waveguide, and a lensed fiber.

Active PIC 106 is configured to receive light from fiber coupler 104 and to use the light with one or more photonic devices. Further, active PIC 106 is configured to assist with the optical edge coupling alignment between fiber coupler 104 and active PIC 106 and to monitor the optical coupling alignment between fiber coupler 104 and active PIC 106 during operation. Examples of active PIC 106 may include, but are not limited to, an optical interposer, a photonic switch, and an optical transceiver. Active PIC 106 may use a lithographically-defined layout of single-mode and/or multi-mode waveguide elements to form a photonic circuit. Materials for constructing active PIC 106 include, but are not limited to, gallium arsenide (GaAs), indium phosphide (InP), lithium niobate (LiNbO3), lead zirconate titanate (PLZT), silicon nitride (SiN), silicon oxynitride (SiON), and polymers.

Figure 2:
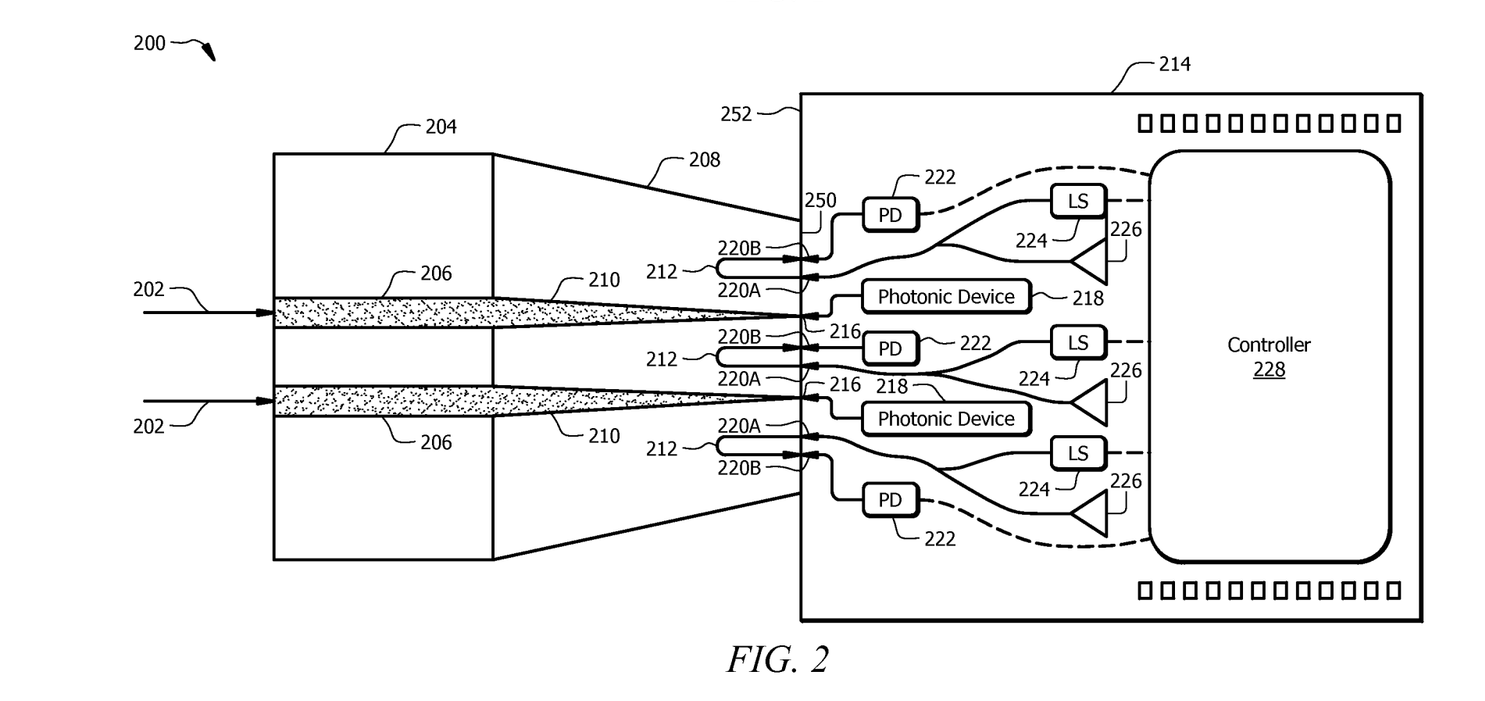
FIG. 2 is a schematic diagram of an embodiment of an optical system using edge coupling with edge coupling monitoring.

FIG. 2 is a schematic diagram of an embodiment of an optical system 200 using edge coupling with edge coupling monitoring. Optical system 200 includes a fiber array 204, a fiber coupler 208, and an active PIC 214. Fiber array 204, fiber coupler 208, and active PIC 214 are configured similarly to fiber array 102, fiber coupler 104, and active PIC 106 in FIG. 1, respectively. Optical system 200 is configured to send light from fiber array 204 to fiber coupler 208 and from fiber coupler 208 to active PIC 214. Optical system 200 is configured to provide edge coupling alignment between fiber coupler 208 and active PIC 214 and to monitor the edge coupling alignment between fiber coupler 208 and active PIC 214 during operation. Monitoring the edge coupling alignment may include detecting drift, warping (e.g., lateral, vertical, or horizontal), roll, and positional misalignments. Optical system 200 may be configured as shown or in any other suitable manner.

Fiber array 204 has a plurality of waveguides 206 and is configured to receive light from optical fibers 202 and guide the light to fiber coupler 208 using the waveguides 206. Waveguides 206 may include single-mode waveguides and/or multi-mode waveguides.

Fiber coupler 208 has a plurality of signal waveguides 210 and one or more waveguide loops 212. Fiber coupler 208 is configured to guide a first light from fiber array 204 to active PIC 214 using the signal waveguides 210. Signal waveguides 210 may include single-mode waveguides and/or multimode waveguides. Fiber coupler 208 is also configured to assist with edge coupling alignment between fiber coupler 208 and active PIC 214 using the waveguide loops 212. Waveguide loops 212 are positioned along the surface 250 of fiber coupler 208 that interfaces with active PIC 214. Waveguide loops 212 are configured to receive a second light from a first alignment edge coupler, for example, alignment edge coupler 220A, one of a pair of alignment edge couplers on active PIC 214, and to guide the second light to a second alignment edge coupler, for example, alignment edge coupler 220B, of the pair of alignment edge couplers on active PIC 214. Waveguide loops 212 may include single-mode waveguides or multi-mode waveguides that are positioned along an edge of fiber coupler 208 that interfaces with active PIC 214. In an embodiment, fiber coupler 208 has three waveguide loops 212, such that a first waveguide loop 212 is positioned at about the center of fiber coupler 208 between signal waveguides 210, and a second waveguide loop 212 and a third waveguide loop 212 are positioned outside of the outermost signal waveguides 210. In another embodiment, one or more signal waveguides 210 can be positioned laterally outside of the second waveguide loop 212 or the third waveguide loop 212. Waveguide loops 212 may further include mirrors, reflectors, or any other suitable component for guiding and redirecting light as would be appreciated by one of ordinary skill in the art upon viewing this disclosure.

Active PIC 214 includes signal couplers 216, alignment couplers 220A and 220B, one or more photodetectors (PDs) 222, one or more light sources 224, a controller 228, one or more surface grating couplers 226, and one or more photonic devices 218. In an embodiment, active PIC 214 is configured to receive a first light from signal waveguides 210 on fiber coupler 208 and to process the first light using photonic devices 218. Active PIC 214 is also configured to assist with edge coupling alignment between active PIC 214 and fiber coupler 208 by providing a second light to waveguide loop 212 on fiber coupler 208 and receiving the second light from the waveguide loop 212 on fiber coupler 208 when the active PIC 214 and fiber coupler 208 are aligned. In another embodiment, active PIC 214 may be configured to receive the first light directly from fiber array 204 or from any other optical component. The transparency of waveguide materials used in active PIC 214 determines the wavelength of the second light that is used for aligning active PIC 214 and fiber coupler 208. The second light may or may not use the same wavelength as the first light. Further, the second light may be a single-mode light that has a fundamental light mode or a multi-mode light that has a fundamental light mode and one or more higher-order light modes.

Signal couplers 216 may be nano-tapered edge couplers, evanescent edge couplers, or granting couplers. Signal couplers 216 are positioned along a surface 252 of the active PIC 214 that interfaces with fiber coupler 208. Signal couplers 216 are configured to be optically coupled to signal waveguides 210 in fiber coupler 208, to receive light from fiber coupler 208, and to guide the light to one or more photonic devices 218.

Alignment couplers 220A and 220B may be nano-tapered edge couplers, evanescent edge couplers, or grating couplers. Alignment couplers 220A and 220B are configured to be optically coupled to waveguide loops 212 in fiber coupler 208. One or more pairs of alignment couplers 220A and 220B are positioned along the surface 252 of active PIC 214 that interfaces with fiber coupler 208. Alignment couplers 220A are configured to guide light from light source 224 or surface grating coupler 226 to the waveguide loop 212 on fiber coupler 208. Alignment couplers 220B are configured to receive light from the waveguide loop 212 on fiber coupler 208 and to guide the light to photodetector 222.

Photodetectors 222 are configured to detect light from alignment couplers 220B and to generate an electrical signal in response to detecting light. For example, photodetectors 222 may be configured to generate an electrical current between about 1 microamp (µA) and about 10 µA in response to the received light. Examples of photodetectors 222 may include, but are not limited to, photodiodes or any other suitable device for detecting light as would be appreciated by one of ordinary skill in the art upon viewing this disclosure. Photodetectors 222 may be constructed using any suitable group IV semiconductors, group III-V materials, or any other suitable materials.

Light sources 224 are configured to receive control signals from controller 228, to generate a light, and to send the light to alignment couplers 220A. Examples of light sources 224 may include, but are not limited to, lasers, embedded lasers, vertical-cavity surface-emitting lasers (VCSELs), semiconductor optical amplifiers (SOAs), distributed feedback (DFB) lasers, and light-emitting diodes (LEDs). One or more light sources 224 may be monolithically integrated into controller 228.

Surface grating couplers 226 are configured to receive light from an external light source and to guide the light to alignment couplers 220A. Surface grating couplers 226 are configured to optically couple external light sources to alignment couplers 220A. Surface grating couplers 226 may be optically joined to a common waveguide with light sources 224 and alignment couplers 220A using optical combiners (e.g., Y-junction or multi-mode interference (MMI) combiners). Surface grating couplers 226 may include single-mode waveguides or multimode waveguides. In an embodiment, surface grating couplers 226 may be omitted.

Controller 228 is configured to communicate control signals and electrical signals with photodetectors 222, light sources 224, and photonic devices 218. For example, controller 228 is configured to activate light sources 224 to generate lights to send to waveguide loops 212, and to receive electrical signals from photodetectors 222 in response to the photodetectors 222 receiving or detecting light from waveguide loops 212. Controller 228 may also be configured to process electrical signals from photonic devices 218 and photodetectors 222. For example, controller 228 may determine whether active PIC 214 and fiber coupler 208 are aligned. Alternatively, controller 228 may be configured to communicate electrical signals from photonic devices 218 and photodetectors 222 to other devices for processing. Examples of controller 228 may include, but are not limited to, a complementary metal-oxide semiconductor (CMOS) flip-chip and a processor. Photonic devices 218 are configured to perform one or more photonic functions on light or an optical signal. For example, photonic devices 218 may be semiconductor circuits or chips that integrate multiple optical or opto-electrical components.

Figure 3:
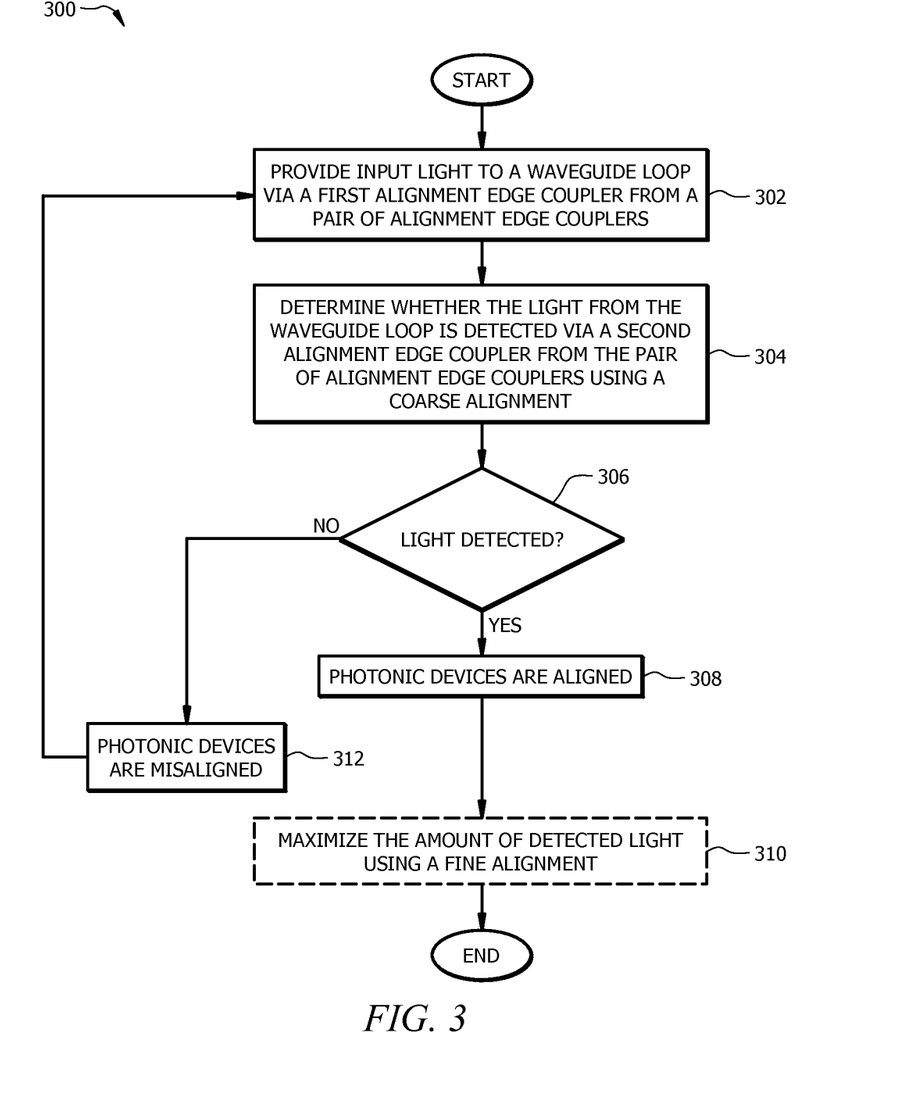
FIG. 3 is a flowchart of an embodiment of an edge coupling alignment method.

FIG. 3 is a flowchart of an embodiment of an edge coupling alignment method 300 for an active PIC (e.g., active PIC 214 in FIG. 2). Method 300 can be implemented by a controller (e.g., controller 228 in FIG. 2) on an active PIC to align a fiber coupler (e.g., fiber coupler 208 in FIG. 2) and the active PIC for use in an optical system (e.g., optical system 100 in FIG. 1). Method 300 may be implemented for testing photonic devices, for assembling or packaging a product, and for monitoring the edge coupling alignment between the photonic devices. Method 300 is used to determine whether the fiber coupler and the active PIC are aligned using waveguide loops (e.g., waveguide loops 212 in FIG. 2) on the fiber coupler and alignment couplers (e.g., alignment couplers 220A and 220B in FIG. 2) on the active PIC.

At step 302, the active PIC uses a light source and a first alignment coupler from a pair of alignment couplers to provide a light to a waveguide loop. A light source or a surface grating coupler may provide light to the first alignment coupler. At step 304, the active PIC uses a photodetector and a second alignment coupler from the pair of alignment couplers to determine whether the light from the waveguide loop is detected. When at least a portion of the light from the waveguide loop is detected at the second alignment coupler, a photodetector generates an electrical signal (e.g., an electrical current), and outputs the electrical signal to a controller. The controller may process the electrical signal to determine that the light from the waveguide loop is detected at the second alignment coupler.

At step 306, the active PIC proceeds to step 308 when light is detected at the second alignment coupler from the waveguide loop; otherwise, the active PIC proceeds to step 312 when light is not detected from the waveguide loop. At step 308, the active PIC determines that the photonic devices are aligned. Optionally at step 310, the active PIC finely controls the alignment process based on the intensity of the light from the waveguide loop, for example, to maximize the amount of light detected.

Returning to step 306, the active PIC proceeds to step 312 when light is not detected from the waveguide loop. At step 312, the active PIC determines that the photonic devices are misaligned and returns to step 302. The active PIC may also generate a signal to indicate the misalignment. In another embodiment, the active PIC may not return to step 302 when the active PIC determines that the photonic devices are misaligned. For example, the active PIC may generate an error signal and may terminate.

In an embodiment, the fiber coupler and the active PIC may be physically coupled to each other when the fiber coupler and the active PIC are aligned. For example, the fiber coupler and the active PIC may be coupled together using an adhesive, an epoxy, a solder joint, or any other suitable bonding technique as would be appreciated by one of ordinary skill in the art upon viewing this disclosure.

Figure 4:
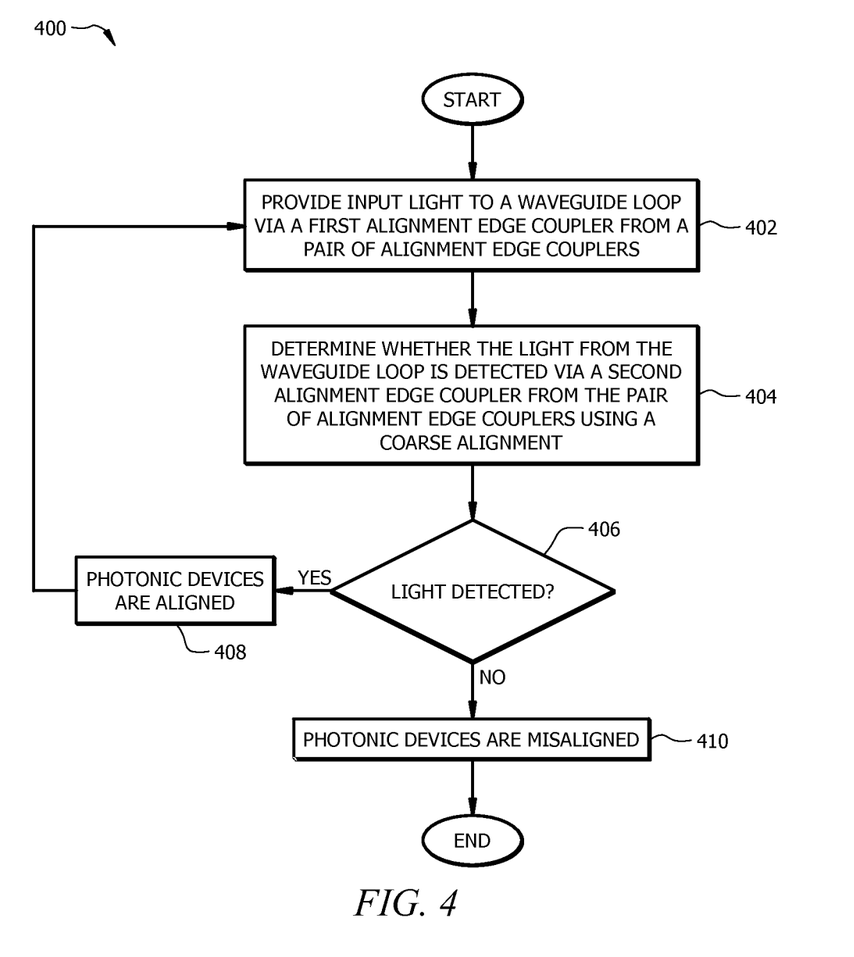
FIG. 4 is a flowchart of an embodiment of an edge coupling alignment monitoring method.

FIG. 4 is a flowchart of an embodiment of an edge coupling alignment monitoring method 400 for an active PIC (e.g., active PIC 214 in FIG. 2). Method 400 can be implemented by a controller (e.g., controller 228 in FIG. 2) on an active PIC to monitor the edge coupling alignment between the fiber coupler and the active PIC during operation. Method 400 may be implemented for monitoring edge coupling alignment while assembling or packaging a product, testing photonic devices, and using photonic devices. Method 400 is used to determine whether the fiber coupler and the active PIC are aligned using waveguide loops (e.g., waveguide loops 212 in FIG. 2) on the fiber coupler and alignment couplers (e.g., alignment couplers 220A and 220B in FIG. 2) on the active PIC.

At step 402, the active PIC uses a light source and a first alignment coupler from a pair of alignment couplers to provide a light to a waveguide loop. A light source or a surface grating coupler may provide light to the first alignment coupler. At step 404, the active PIC uses a photodetector and a second alignment coupler from the pair of alignment couplers to determine whether the light from the waveguide loop is detected. When at least a portion of the light from the waveguide loop is detected at the second alignment coupler, a photodetector generates an electrical signal (e.g., an electrical current), and outputs the electrical signal to a controller. The controller may process the electrical signal to determine that the light from the waveguide loop is detected at the second alignment coupler. At step 406, the active PIC proceeds to step 408 when light is detected at the second alignment coupler from the waveguide loop; otherwise, the active PIC proceeds to step 410 when light is not detected from the waveguide loop. At step 408, the active PIC determines that the photonic devices are aligned and the active PIC returns to step 302 for further monitoring of the edge coupling alignment between the active PIC and the fiber coupler. Monitoring the edge coupling alignment between the active PIC and the fiber coupler may be performed continuously or at predetermined time intervals during operation. Alternatively, the active PIC may terminate when monitoring the edge coupling alignment between the active PIC and the fiber coupler is not required. Returning to step 406, the active PIC proceeds to step 410 when light is not detected from the waveguide loop. At step 410, the active PIC determines that the photonic devices are misaligned and terminates. The active PIC may also generate a signal to indicate the misalignment. For example, the active PIC may generate an error signal and may terminate.

Figure 5:
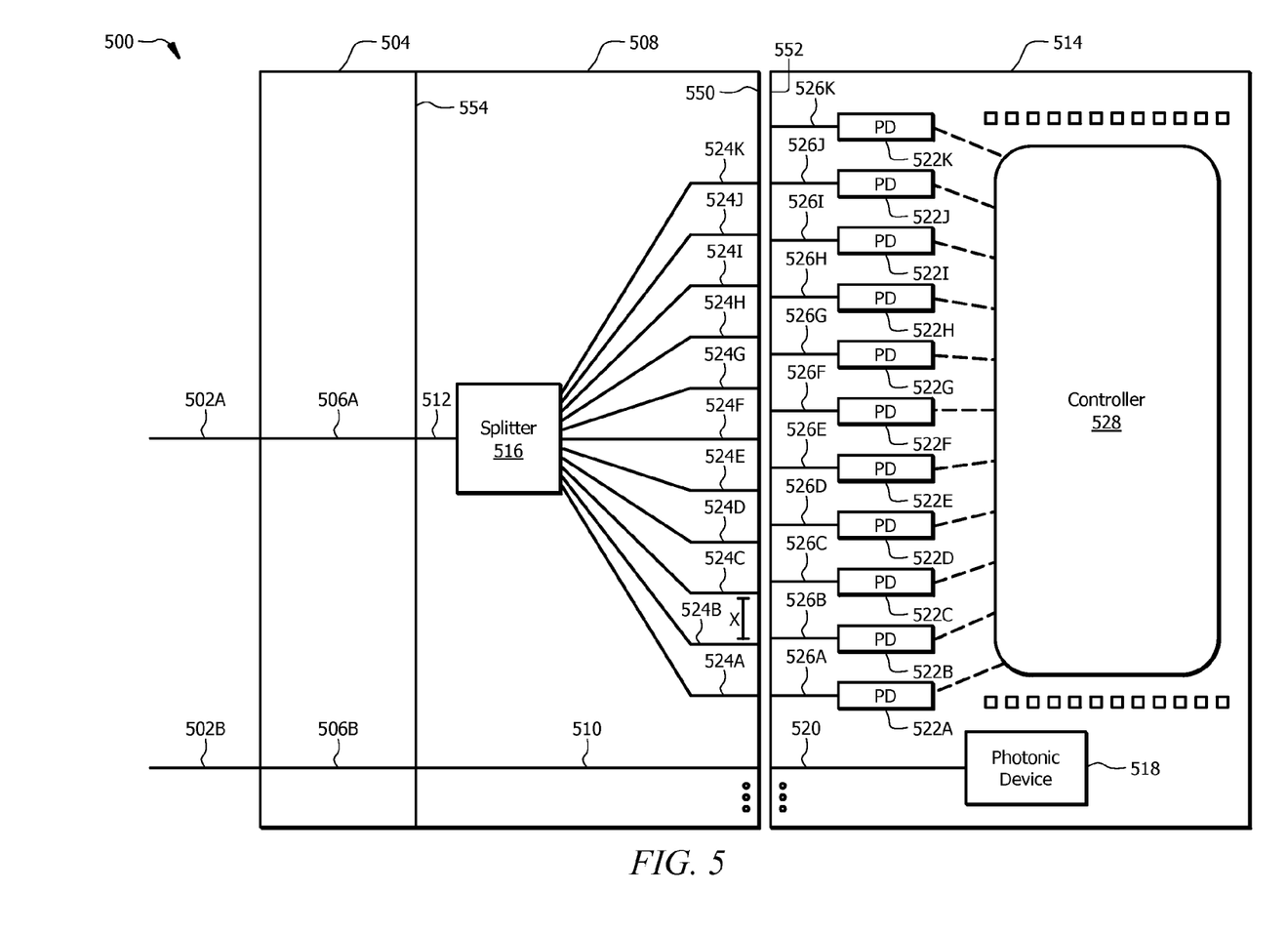
FIG. 5 is a schematic diagram of an embodiment of an optical system using Vernier edge coupling with edge coupling monitoring.

FIG. 5 is a schematic diagram of an embodiment of an optical system 500 using Vernier edge coupling with edge coupling monitoring. Optical system 500 includes a fiber array 504, a fiber coupler 508, and an active PIC 514. Fiber array 504, fiber coupler 508, and active PIC 514 are configured similarly to fiber array 102, fiber coupler 104, and active PIC 106 in FIG. 1. Optical system 500 is configured to send light from fiber array 504 to fiber coupler 508 and from fiber coupler 508 to active PIC 514. Optical system 500 is configured to provide edge coupling alignment between fiber coupler 508 and active PIC 514 and to monitor the edge coupling alignment between fiber coupler 508 and active PIC 514 during operation. Monitoring the edge coupling alignment may include detecting drift, lateral warping, roll, and positional misalignments. Optical system 500 may be configured as shown or in any other suitable manner.

Fiber array 504 has a plurality of waveguides 506A and 506B. Waveguides 506A and 506B may include single-mode waveguides and/or multi-mode waveguides. Fiber array 504 is configured to receive light from optical fibers 502A and 502B and to guide the light to fiber coupler 508 using waveguides 506A and 506B.

Fiber coupler 508 includes waveguides 510 and 512, an optical splitter 516, and a plurality of alignment waveguides 524A-524K. Fiber coupler 508 is configured to receive a first light from waveguide 506A using waveguide 512, to distribute the first light among the plurality of alignment waveguides 524A-524K using optical splitter 516, and to output the first light to active PIC 514 using the plurality of alignment waveguides 524A-524K. Waveguide 512 is an alignment fiber channel. Waveguide 512 extends from a first surface 554 of fiber coupler 508 and may be configured as a single-mode waveguide or a multi-mode waveguide. For example, waveguide 512 extends from an interface between fiber array 504 and fiber coupler 508. Optical splitter 516 is shown as a 1:10 optical splitter for illustrative purposes. Optical splitter 516 may include any other suitable number of output channels as would be appreciated by one of ordinary skill in the art upon viewing this disclosure. Similarly, the plurality of alignment waveguides 524A-524K may include any suitable number of waveguides. Alignment waveguides 524A-524K extend to a second surface 550 of fiber coupler 508 and are configured to be about equally spaced a length, x, from each other. For example, alignment waveguides 524A-524K extend to the interface (e.g., surface 550) between fiber coupler 508 and active PIC 514. Further, fiber coupler 508 is configured to receive a second light from waveguide 506B using waveguide 510 and to output the second light to active PIC 514 using waveguide 510. Waveguide 510 is a signal waveguide or a data fiber channel. Waveguide 510 is configured to extend from the interface (e.g., the first surface 554) between fiber array 504 and fiber coupler 508 to an interface (e.g., the second surface 550) between fiber coupler 508 and active PIC 514. Waveguide 510 may be configured as a single-mode waveguide or a multi-mode waveguide.

Active PIC 514 includes a plurality of alignment couplers 526A-526K, a plurality of photodetectors 522A-522K, a controller 528, a photonic device 518, and a coupler 520. Active PIC 514 is configured to receive a first light from fiber coupler 508 at one or more of the plurality of alignment couplers 526A-526K to determine whether the fiber coupler 508 and the active PIC 514 are aligned, and to determine a misalignment offset between the fiber coupler 508 and the active PIC 514 in accordance with the alignment couplers 526A-526K that received the light from fiber coupler 508. Further, active PIC 514 is configured to receive a second light from waveguide 510 on fiber coupler 508 when the fiber coupler 508 and active PIC 514 are aligned. Active PIC 514 and fiber coupler 508 are aligned when two of the alignment couplers 526A-526K receive the first light from alignment waveguides 524A-524K on fiber coupler 508. For example, active PIC 514 and fiber coupler 508 are aligned when alignment couplers 526A and 526J receive the first light from alignment waveguides 524A and 524K on fiber coupler 508, respectively. Active PIC 514 and fiber coupler 508 are misaligned when less than two of the alignment couplers 526A-526K receive the first light from fiber coupler 508. Alignment couplers 526A-526K may be nano-tapered edge couplers, evanescent edge couplers, or grating couplers. Alignment couplers 526A-526K are positioned along an interface (e.g., surface 552) between active PIC 514 and fiber coupler 508 and are configured to be equally spaced from each other. Alignment couplers 526A-526K are configured to be optically coupled to alignment waveguides 524A-524K when one or more of the alignment waveguides 524A-524K are at least partially aligned with one of the alignment couplers 526A-526K.

Alignment waveguides 524A-524K and alignment couplers 526A-526K are configured to operate similarly to a Vernier scale, where N graduations of alignment waveguides 524A-524K covers N-1 graduations of alignment couplers 526A-526K. Accordingly, the ratio of the spacing lengths of the alignment waveguides 524A-524K to the spacing lengths of the alignment couplers 526A-526K may be N:N-1. For example, assuming a decimal spacing, alignment waveguides 524A-524K are positioned to cover about nine tenths of the spacing used for alignment couplers 526A-

526K. When alignment waveguide 524A and alignment coupler 526A are aligned, alignment waveguide 524B is offset from alignment coupler 526B about one-tenth of distance x between two neighboring channels on 514, alignment waveguide 524C is offset from alignment coupler 526C about two-tenths of x, alignment waveguide 524D is offset from alignment coupler 526D about three-tenths of x, and so on. When alignment waveguide 524A and alignment coupler 526A are aligned, alignment waveguide 524K is also aligned with 526J. As such, when fiber coupler 508 and active PIC 514 are aligned, two of the alignment waveguides 524A-524K, for example, alignment waveguides 524A and 524K, are aligned with two of the alignment couplers 526A-526K, for example, alignment couplers 526A and 526J.

When fiber coupler 508 and active PIC 514 are misaligned, less than two of the alignment waveguides 524A-524K are aligned with alignment coupler 526A-526K. A misalignment offset can be determined when active PIC 514 and fiber coupler 508 are misaligned by using the alignment couplers 526A-526K. For example, when fiber coupler 508 and active PIC 514 are misaligned by one-tenth of x, alignment waveguide 524B is aligned with alignment coupler 526B, when fiber coupler 508 and active PIC 514 are misaligned by two-tenths of x, alignment waveguide 524C is aligned with alignment coupler 526C, and so on. When alignment waveguide 524B is aligned with alignment coupler 526B, coupler 526B receives light from alignment waveguide 524B and photodetector 522B generates an electrical signal. Receiving an electrical signal from photodetector 522B indicates that the active PIC 514 and the fiber coupler 508 have a misalignment offset of about one tenth. Alternatively, alignment waveguides 524A-524K and alignment couplers 526A-526K are configured such that N graduations of alignment couplers 526A-526K covers N-1 graduations of alignment waveguides 524A-524K. Accordingly, the ratio of the spacing lengths of the alignment waveguides 524A-524K to the spacing lengths of the alignment couplers 526A-526K may be N-1:N.

Photodetectors 522A-522K are optically coupled to alignment couplers 526A-526K, respectively. Photodetectors 522A-522K are configured to detect light from alignment couplers 526A-526K, respectively, and to generate an electrical signal in response to detecting light. Examples of photodetectors 522A-522K may include, but are not limited to, photodiodes or any other suitable device for detecting light as would be appreciated by one of ordinary skill in the art upon viewing this disclosure. Photodetectors 522A-522K may be constructed using any suitable group IV semiconductors, group III-V materials, or any other suitable materials.

Controller 528 is configured to communicate control signals and electrical signals with photodetectors 522A-522K and photonic device 518. For example, controller 528 is configured to receive electrical signals from photodetectors 522A-522K in response to photodetectors 522A-522K detecting light. Controller 528 is also configured to process electrical signals from photodetectors 522A-522K and photonic device 518. For example, controller 528 is configured to determine that fiber coupler 508 and active PIC 514 are aligned when controller 528 receives electrical signals from two of the photodetectors 522A-522K, for example, photodetectors 522A and 522J, and to determine that fiber coupler 508 and active PIC 514 are misaligned when controller 528 receives electrical signals from less than two of the photodetectors 522A-522K.

In another embodiment, fiber coupler 508 and active PIC 514 are aligned when light is detected at a first photodetector. For example, fiber coupler 508 and active PIC 514 are aligned when light is detected by photodetector 522A. Further, fiber coupler 508 and active PIC 514 are misaligned when light is detected at a photodetector other than the first photodetector. The other photodetectors may each be associated with a misalignment offset. Controller 528 is configured to determine that fiber coupler 508 and active PIC 514 are aligned when controller 528 receives an electrical signal from the first photodetector, for example, photodetector 522A, and to determine that fiber coupler 508 and active PIC 514 are misaligned when controller 528 receives an electrical signal from any other photodetector.

Coupler 520 may be a nano-tapered edge coupler, an evanescent edge coupler, or a grating coupler. Coupler 520 is configured to be optically coupled to waveguide 510 on fiber coupler 508 when the fiber coupler 508 and the active PIC 514 are aligned. Coupler 520 is configured to receive a second light from waveguide 510 on fiber coupler 508 and to guide the second light to photonic device 518. Photonic device 518 is configured to perform one or more photonic functions on light or an optical signal. For example, photonic device 518 may be a semiconductor circuit or a chip that integrates multiple optical or opto-electrical components.

Figure 6:
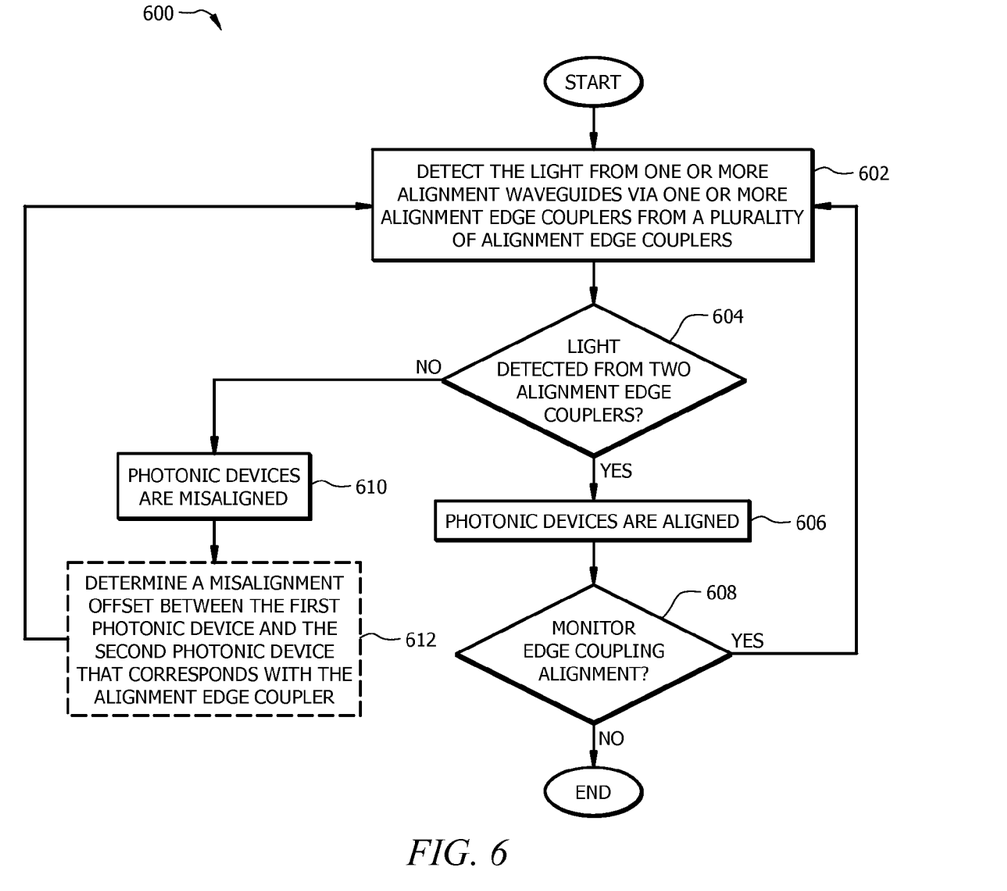
FIG. 6 is a flowchart of an embodiment of an edge coupling alignment method using Vernier edge coupling.

FIG. 6 is a flowchart of an embodiment of an edge coupling alignment method 600 using Vernier edge coupling for an active PIC (e.g., active PIC 514 in FIG. 5). Method 600 is implemented by a controller (e.g., controller 528 in FIG. 5) to determine whether a fiber coupler (e.g., fiber coupler 104 in FIG. 1) and an active PIC (e.g., active PIC 106 in FIG. 1) are aligned. For example, method 600 may be used for testing photonic devices, for assembling or packaging a product, and/or for monitoring the edge coupling alignment. Method 600 determines whether a fiber coupler and an active PIC are aligned using Vernier edge coupling between a plurality of alignment waveguides (e.g., alignment waveguides 524A-524K in FIG. 5) and a plurality of alignment couplers (e.g., alignment couplers 526A-526K in FIG. 5). Further, method 600 may be employed to monitor the edge coupling alignment between the fiber coupler and the active PIC.

At step 602, the active PIC detects light from at least one alignment waveguide on the fiber coupler via at least one alignment coupler from a plurality of alignment couplers. The alignment couplers are optically coupled to the photodetectors. Light from the alignment waveguides is guided by one or more alignment couplers and is detected using the photodetectors. The photodetectors generate an electrical signal in response to detecting the light and sends the electrical signal to the controller.

At step 604, the active PIC determines whether light is detected at two alignment couplers from the plurality of alignment couplers. Active PIC proceeds to step 606 when light is detected from two alignment couplers; otherwise, active PIC proceeds to step 610. For example, the controller determines how many electrical signals were received in response to photodetectors detecting light.

At step 606, the active PIC determines that the photonic devices are aligned. At step 608, the active PIC determines whether monitoring edge coupling alignment between the active PIC and the fiber coupler is required. The active PIC returns to step 602 when monitoring edge coupling alignment between the active PIC and the fiber coupler is required; otherwise, method 600 terminates when monitoring edge coupling alignment between the active PIC and the fiber coupler is not required. The active PIC may also generate a signal to indicate the alignment. The controller may have instructions that indicate whether the active PIC is configured to monitor edge coupling alignment between the active PIC and the fiber coupler. Monitoring the edge coupling alignment between the active PIC and the fiber coupler may be performed continuously or at predetermined time intervals during operation.

Returning to step 604, the active PIC proceeds to step 610 when light is detected at less than two alignment couplers. At step 610, the active PIC determines that the photonic devices are misaligned and returns to step 602 or, optionally, proceeds to step 612 and then returns to step 602. The active PIC may also generate a signal to indicate the misalignment. Optionally, at step 612, active PIC determines a misalignment offset between the active PIC and the fiber coupler. For example, the controller determines which photodetector sends an electrical signal in response to an alignment coupler receiving light and calculates a misalignment offset in accordance with the alignment coupler and photodetector.

In an embodiment, the fiber coupler and the active PIC may be physically coupled to each other when the fiber coupler and the active PIC are aligned. For example, the fiber coupler and the active PIC may be coupled together using an adhesive, an epoxy, a solder joint, or any other suitable bonding technique as would be appreciated by one of ordinary skill in the art upon viewing this disclosure.

Figure 7:
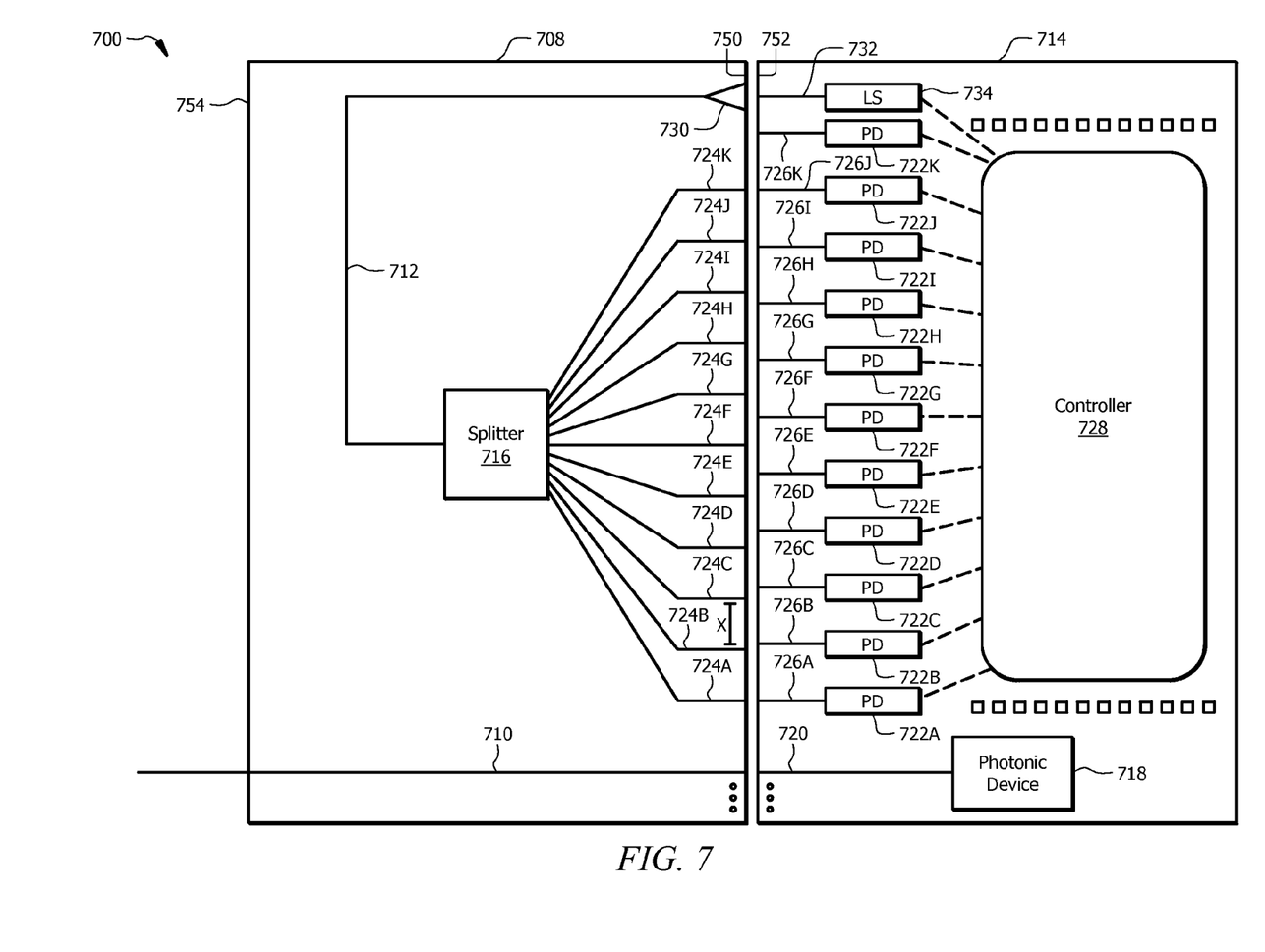
FIG. 7 is a schematic diagram of another embodiment of an optical system using Vernier edge coupling with edge coupling monitoring.

FIG. 7 is a schematic diagram of another embodiment of an optical system 700 using Vernier edge coupling with edge coupling monitoring. Optical system 700 includes a fiber coupler 708 and an active PIC 714. Fiber coupler 708 and active PIC 714 are configured similarly to fiber coupler 104 and active PIC 106 in FIG. 1, respectively. Optical system 700 is configured to send light from fiber coupler 708 to active PIC 714, provide edge coupling alignment between fiber coupler 708 and active PIC 714, and monitor the edge coupling alignment between fiber coupler 708 and active PIC 714 during operation. Monitoring the edge coupling alignment may include detecting drift, lateral warping, roll, and positional misalignments. Optical system 700 may be configured as shown or in any other suitable manner.

Fiber coupler 708 includes waveguides 710 and 712, tapered coupler 730, optical splitter 716, and a plurality of alignment waveguides 724A-724K. Fiber coupler 708 is configured to receive a first light from waveguide 732 on active PIC 714 using tapered coupler 730 and waveguide 712 to distribute the first light among the plurality of alignment waveguides 724A-724K using optical splitter 716, and to output the first light to active PIC 714 using the plurality of alignment waveguides 724A-724K. Tapered coupler 730 may be a nano-tapered edge coupler, an evanescent edge coupler, or a grating coupler. Tapered coupler 730 is positioned along a first surface 750 of fiber coupler 708 and is optically coupled to waveguide 712. Tapered coupler 730 is configured to widen towards the first surface 750 and may be configured as a single-mode waveguide or a multi-mode waveguide. Waveguide 712 is optically coupled to tapered coupler 730 and optical splitter 716. Waveguide 712 may be configured as a single-mode waveguide or a multimode waveguide. Optical splitter 716 is shown as a 1:10 optical splitter for illustrative purposes. Optical splitter 716 may include any other suitable number of output channels as would be appreciated by one of ordinary skill in the art upon viewing this disclosure. Similarly, the plurality of alignment waveguides 724A-724K may have any suitable number of waveguides. Alignment waveguides 724A-724K extend to the first surface 750 of fiber coupler 708 and are configured to be about equally spaced a length, x, from each other. For example, alignment waveguides 724A-724K are positioned at an interface between fiber coupler 708 and active PIC 714. Further, fiber coupler 708 is configured to receive a second light, for example, from a fiber array, using waveguide 710 and to output the second light to active PIC 714 using waveguide 710. Waveguide 710 is a data fiber channel and may be a single-mode fiber or multi-mode fiber. Waveguide 710 is configured to extend from a second surface 754 to the first surface 750, which is the interface between fiber coupler 708 and active PIC 714.

Active PIC 714 includes a plurality of alignment couplers 726A-726K, a plurality of photodetectors 722A-722K, a controller 728, a photonic device 718, waveguide 732, and light source 734. Active PIC 714 is configured to output a first light to fiber coupler 708 from light source 734, to receive the first light from fiber coupler 708 at one or more of the plurality of alignment couplers 726A-726K, to determine whether the fiber coupler 708 and the active PIC 714 are aligned, and to determine a misalignment offset between the fiber coupler 708 and the active PIC 714 in accordance with the alignment coupler that received the light from fiber coupler 708. Further, active PIC 714 is configured to receive a second light from waveguide 710 on fiber coupler 708 when the fiber coupler 708 and active PIC 714 are aligned. Active PIC 714 and fiber coupler 708 are aligned when two of the alignment couplers 726A-726K receive the first light from alignment waveguides 724A-724K on fiber coupler 708. For example, active PIC 714 and fiber coupler 708 are aligned when alignment couplers 726A and 726J receive the first light from alignment waveguides 724A and 724K on fiber coupler 708, respectively. Active PIC 714 and fiber coupler 708 are misaligned when less than two of the alignment couplers 726A-726K receive the first light from fiber coupler 708. Alignment couplers 726A-726K may nano-tapered edge couplers, evanescent edge couplers, or grating couplers. Alignment couplers 726A-726K are positioned along a surface 752 between active PIC 714 and fiber coupler 708 and are configured to be equally spaced from each other. Alignment waveguides 724A-724K and alignment couplers 726A-726K are configured to operate similarly to alignment waveguides 524A-524K and alignment couplers 526A-526K in FIG. 5, respectively. Alignment couplers 726A-726K are configured to be optically coupled to alignment waveguides 724A-724K when one or more of the alignment waveguides 724A-724K are at least partially aligned with one of the alignment couplers 726A-726K. When fiber coupler 708 and active PIC 714 are misaligned, less than two of the alignment waveguides 724A-724K are aligned with alignment coupler 726A-726K.

Photodetectors 722A-722K are optically coupled to alignment couplers 726A-726K, respectively. Photodetector 722A-722K are configured to detect light from alignment couplers 726A-726K, respectively, and to generate an electrical signal in response to detecting light. Photodetectors 722A-722K are configured similarly to photodetectors 522A-522K in FIG. 5.

Controller 728 is configured to communicate control signals and electrical signals with photodetectors 722A-722K and photonic device 718. For example, controller 728 is configured to receive electrical signals from photodetectors 722A-722K in response to photodetectors 722A-722K detecting light. Controller 728 is also configured to process electrical signals from photodetectors 722A-722K and photonic device 718. For example, controller 728 is configured to determine that fiber coupler 708 and active PIC 714 are aligned when controller 728 receives electrical signals from two of the photodetectors 722A-722K, for example, photodetectors 722A and 722J, and to determine that fiber coupler 708 and active PIC 714 are misaligned when controller 728 receives electrical signals from less than two of photodetectors 722A-722K.

Light source 734 is configured to receive control signals from controller 728, to generate a light, and to output the light to waveguide 732. Examples of light sources 734 may include, but are not limited to, lasers, embedded lasers, VCSELs, SOAs, DFB lasers, and LEDs. In an embodiment, light sources 734 may be monolithically integrated into controller 728.

Coupler 720 may be a nano-tapered edge coupler, an evanescent edge coupler, or a grating coupler. Coupler 720 is configured to be optically coupled to waveguide 710 on fiber coupler 708 when fiber coupler 708 and active PIC 714 are aligned. Coupler 720 is configured to receive a second light from waveguide 710 on fiber coupler 708 and to guide the second light to photonic device 718. Photonic device 718 is configured to perform one or more photonic functions on light or an optical signal. For example, photonic device 718 may be a semiconductor circuit or a chip that integrates multiple optical or opto-electrical components.

Figure 8:
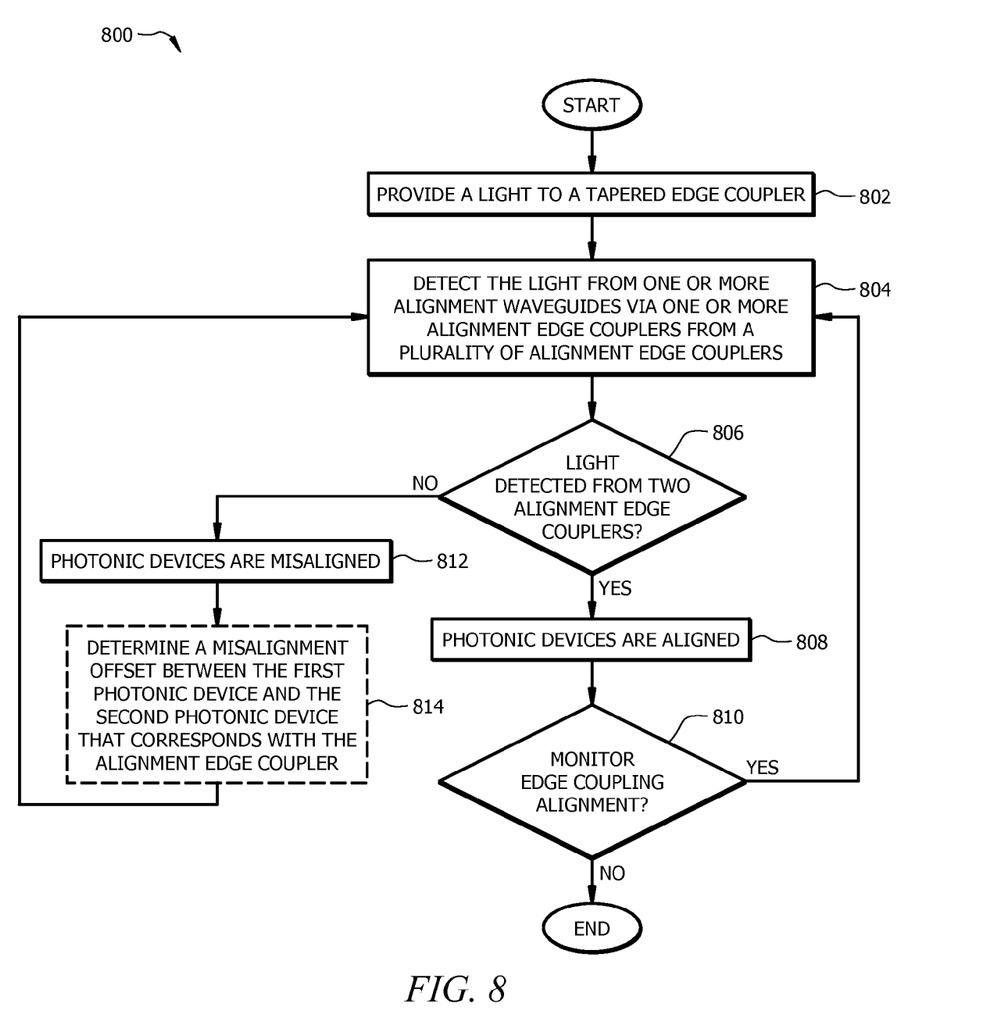
FIG. 8 is a flowchart of another embodiment of an edge coupling alignment method using Vernier edge coupling.

FIG. 8 is a flowchart of another embodiment of an edge coupling alignment method 800 using Vernier edge coupling for an active PIC (e.g., active PIC 714 in FIG. 7). Method 800 is implemented by a controller (e.g., controller 728 in FIG. 7) to determine whether a fiber coupler (e.g., fiber coupler 104 in FIG. 1) and an active PIC (e.g., active PIC 106 in FIG. 1) are aligned. For example, method 800 may be used for testing photonic devices, for assembling or packaging a product, and for monitoring the edge coupling alignment. Method 800 determines whether a fiber coupler and an active PIC are aligned using Vernier edge coupling between a plurality of alignment waveguides (e.g., alignment waveguides 724A-724K in FIG. 7) and a plurality of alignment couplers (e.g., alignment couplers 726A-726K in FIG. 7). Further, method 800 may be employed to monitor the edge coupling alignment between the fiber coupler and the active PIC.

At step 802, the active PIC uses a light source to provide a light to a tapered coupler. A light source or a surface grating coupler may provide light to the tapered coupler. At step 804, the active PIC detects light from at least one alignment waveguide on the fiber coupler via at least one alignment coupler from a plurality of alignment couplers. The alignment couplers are optically coupled to photodetectors. Light from the alignment waveguides is guided by one or more alignment couplers and is detected using the photodetectors. The photodetectors generate an electrical signal in response to detecting the light and send the electrical signal to the controller.

At step 806, the active PIC determines whether light is detected at two alignment couplers from the plurality of alignment couplers. Active PIC proceeds to step 808 when light is detected from two alignment couplers; otherwise, active PIC proceeds to step 812. For example, the controller determines how many electrical signals were received in response to photodetectors detecting light. In an embodiment, the controller coarsely controls the alignment process until light is detected and then finely controls the alignment process to maximize the amount of detected light.

At step 808, the active PIC determines that the photonic devices are aligned. At step 810, the active PIC determines whether monitoring edge coupling alignment between the active PIC and the fiber coupler is required. The active PIC returns to step 802 when monitoring edge coupling alignment between the active PIC and the fiber coupler is required; otherwise, method 800 terminates when monitoring edge coupling alignment between the active PIC and the fiber coupler is not required. The active PIC may also generate a signal to indicate the alignment. The controller may have instructions that indicate whether the active PIC is configured to monitor edge coupling alignment between the active PIC and the fiber coupler. Monitoring the edge coupling alignment between the active PIC and the fiber coupler may be performed continuously or at predetermined time intervals during operation.

Returning to step 806, the active PIC proceeds to step 812 when light is detected at less than two alignment couplers. At step 812, the active PIC determines that the photonic devices are misaligned and returns to step 802 or, optionally, proceeds to step 814 and then returns to step 802. The active PIC may also generate a signal to indicate the misalignment. Optionally, at step 814, active PIC determines a misalignment offset between the active PIC and the fiber coupler. For example, the controller determines which photodetector sends an electrical signal in response to an alignment coupler receiving light and calculates a misalignment offset in accordance with the alignment coupler and photodetector.

In an embodiment, the fiber coupler and the active PIC may be physically coupled to each other when the fiber coupler and the active PIC are aligned. For example, the fiber coupler and the active PIC may be coupled together using an adhesive, an epoxy, a solder joint, or any other suitable bonding technique as would be appreciated by one of ordinary skill in the art upon viewing this disclosure.

Figure 9:
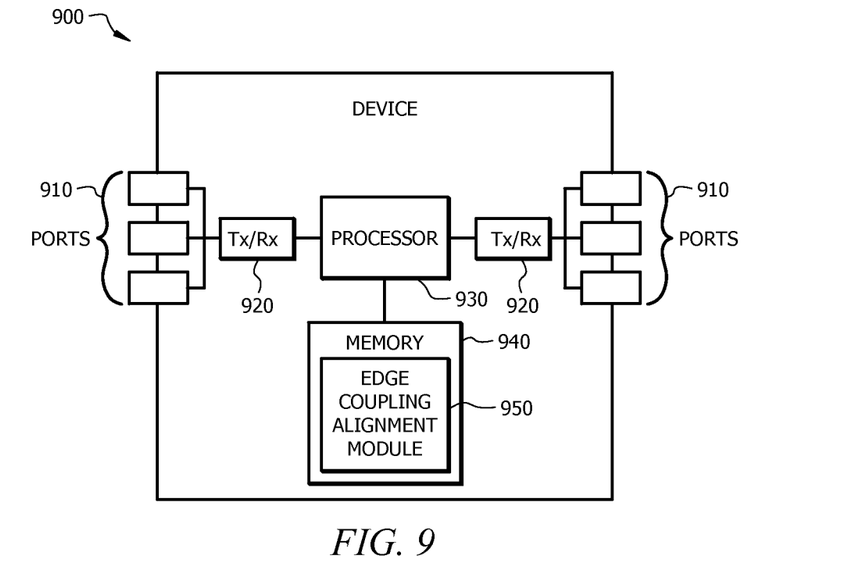
FIG. 9 is an embodiment of a device for implementing edge coupling alignment.

FIG. 9 is a schematic diagram of a device 900. The device 900 may be suitable for implementing the disclosed embodiments. For instance, the device 900 may be employed in a controller. Device 900 includes ports 910, transceiver units (Tx/Rx) 920, a processor 930, and a memory 940 with an edge coupling alignment module 950. Ports 910 are coupled to Tx/Rx 920, which may be transmitters, receivers, or combinations thereof. The Tx/Rx 920 may transmit and receive data via the ports 910. Processor 930 is configured to process data. Memory 940 is configured to store data and instructions for implementing embodiments described herein. The device 900 may also include electrical-to-optical (EO) components and optical-to-electrical (OE) components coupled to the ports 910 and Tx/Rx 920 for receiving and transmitting electrical signals and optical signals.

The processor 930 may be implemented by hardware and software. The processor 930 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 930 is in communication with the ports 910, Tx/Rx 920, and memory 940.

The memory 940 includes one or more of disks, tape drives, and solid-state drives and may be used as an overflow data storage device, to store programs when such programs are selected for execution, and to store instructions and data that are read during program execution. The memory 940 may be volatile and non-volatile and may be read-only memory (ROM), random-access memory (RAM), ternary content-addressable memory (TCAM), and static random-access memory (SRAM). Edge coupling alignment module 950 is implemented by processor 930 to execute the instructions for implementing various embodiments for implementing edge coupling alignment.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a first photonic device comprising a waveguide loop configured to guide a first light from a first location of a surface to a second location of the surface; and
   a second photonic device comprising:
      a light source configured to provide the first light; and
      a first alignment coupler optically coupled to the light source and configured to optically couple to the waveguide loop at the first location;
      a second alignment coupler configured to optically couple to the waveguide loop at the second location; and
      a photodetector optically coupled to the second alignment coupler and configured to:
         detect the first light when the waveguide loop is aligned with the first alignment coupler and the second alignment coupler; and
         generate, based on the detection and on the first light, an electrical signal.

2. The apparatus of claim 1, wherein the first photonic device further comprises a signal waveguide configured to guide a second light to the surface, wherein the second photonic device further comprises a signal coupler configured to be optically coupled to the signal waveguide when the waveguide loop is aligned with the first alignment coupler and the second alignment coupler.

3. The apparatus of claim 2, wherein the signal waveguide is positioned between the waveguide loop and a second waveguide loop configured to guide a third light from a third location of the surface to a fourth location of the surface.

4. The apparatus of claim 1, wherein the first alignment coupler and the second alignment coupler are configured to use evanescent coupling with the waveguide loop.

5. The apparatus of claim 1, wherein the first alignment coupler and the second alignment coupler are configured to use grating coupling with the waveguide loop.

6. The apparatus of claim 1, wherein the second photonic device further comprises a controller in electrical signal communication with the photodetector, and wherein the controller is configured to determine that the first photonic device and the second photonic device are aligned in response to the electrical signal.

7. The apparatus of claim 1, wherein the second photonic device further comprises a controller in electrical signal communication with the photodetector, and wherein the controller is configured to determine that the first photonic device and the second photonic device are misaligned in response to not receiving the electrical signal.

8. The apparatus of claim 1, wherein the second photonic device further comprises a controller in signal communication with the light source and configured to transmit a control signal for the light source to generate the first light.

9. An optical edge coupling method comprising:
   transmitting a first light to a waveguide loop on a first photonic device via a first alignment coupler on a second photonic device;
   attempting to detect the first light at a second alignment coupler on the second photonic device; and
   determining an alignment of the first photonic device and the second photonic device based on the attempting by:
      determining that the first photonic device and the second photonic device are aligned when the first light is detected; or
      determining that the first photonic device and the second photonic device are misaligned when the first light is not detected.

10. The method of claim 9, wherein transmitting the first light comprises a light source generating the first light.

11. The method of claim 9, wherein transmitting the first light comprises receiving the first light from a surface grating coupler on the second photonic device.

12. An apparatus comprising:
   a light source optically coupled to a first alignment coupler and configured to output a first light;
   a photodetector optically coupled to a second alignment coupler and configured to attempt to detect the first light; and
   a controller configured to:
      generate a control signal for the light source to output the first light;
      receive an electrical signal in response to the photodetector detecting the first light;
      monitor the first light via the photodetector; and
      determine an alignment when the photodetector detects the first light or determine a misalignment when the photodetector does not detect the first light.

13. The apparatus of claim 12, wherein the controller is configured to determine a detected light output for the first light.

14. The apparatus of claim 12, wherein monitoring the first light comprises determining an edge coupling misalignment when the first light is no longer detected.

15. The apparatus of claim 12, further comprising a surface grating coupler optically coupled to the first alignment coupler.

16. The apparatus of claim 12, further comprising a photonic device optically coupled to a signal coupler and configured to receive a second light from the signal coupler.

17. The apparatus of claim 12, wherein the controller is configured to continuously monitor the first light.

18. The apparatus of claim 12, wherein the controller is configured to monitor the first light at predetermined time intervals.

19. An optical edge coupling method comprising:
   transmitting a first light to a waveguide loop on a first photonic device via a first alignment coupler on a second photonic device;
   attempting to detect the first light at a second alignment coupler on the second photonic device;

determining an alignment of the first photonic device and the second photonic device based on the attempting, coarsely controlling an alignment process between the first photonic device and the second photonic device until detecting the first light; and finely controlling, upon detecting the first light, the alignment process to increase an amount of the first light.

\* \* \* \* \*

UNITED STATES PATENT AND TRADEMARK OFFICE
CERTIFICATE OF CORRECTION

PATENT NO. : 9,513,447 B1  
APPLICATION NO. : 14/712153  
DATED : December 6, 2016  
INVENTOR(S) : Celo et al.

Page 1 of 1

It is certified that error appears in the above-identified patent and that said Letters Patent is hereby corrected as shown below:

On the Title Page

Item (73) should read:  
(73) Huawei Technologies Co., Ltd., Shenzhen (CN)

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*